United States Patent [19]
Yano

[11] 3,714,401
[45] Jan. 30, 1973

[54] CONVEYOR TYPE CONTINUOUS WEIGHING SYSTEM

[75] Inventor: Yoshio Yano, Kitakyushu, Japan

[73] Assignee: Kabushiki Kaisha Imamura Seisakusho, Kitakyushu, Japan

[22] Filed: Sept. 27, 1971

[21] Appl. No.: 183,753

[52] U.S. Cl. ............235/151.33, 177/3, 177/15, 177/25, 235/92 WT
[51] Int. Cl. ............G06f 15/46, G01g 11/14
[58] Field of Search .......235/151.33, 92 WT, 92 NT; 177/1, 3, 15, 16, 25

[56] References Cited

UNITED STATES PATENTS

| | | | |
|---|---|---|---|
| 3,608,655 | 9/1971 | Ray et al. | 177/1 |
| 3,388,758 | 6/1968 | Allen et al. | 235/151.33 X |
| 3,205,956 | 9/1965 | Bell et al. | 235/92 WT X |
| 3,589,457 | 6/1971 | Joos | 235/92 WT X |

Primary Examiner—Eugene G. Botz
Assistant Examiner—Jerry Smith
Attorney—Albert H. Oldham et al.

[57] ABSTRACT

A conveyor type continuous weighing system having a weighing conveyor, a pulse generator, a high-frequency oscillator, a plurality of counters, a shift register, an integrated weight indicator and a comparator. In the system, the counters count the number of high-frequency pulses representing the weight of a material being conveyed in response to the application of pulses from the pulse generator to the shift register, and the new count is added to the previous count. The sum of the weight of the material having been discharged from the weighing conveyor and the weight of the material existing on the weighing conveyor is compared with a predetermined setting, and the supply of the material is stopped when the sum attains the predetermined setting.

4 Claims, 4 Drawing Figures

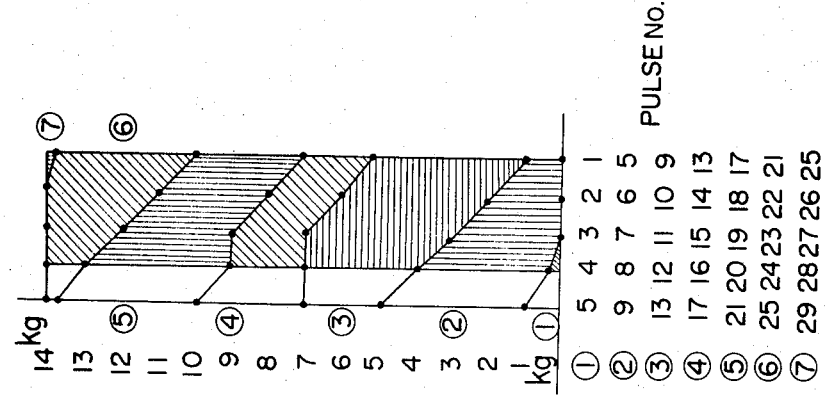
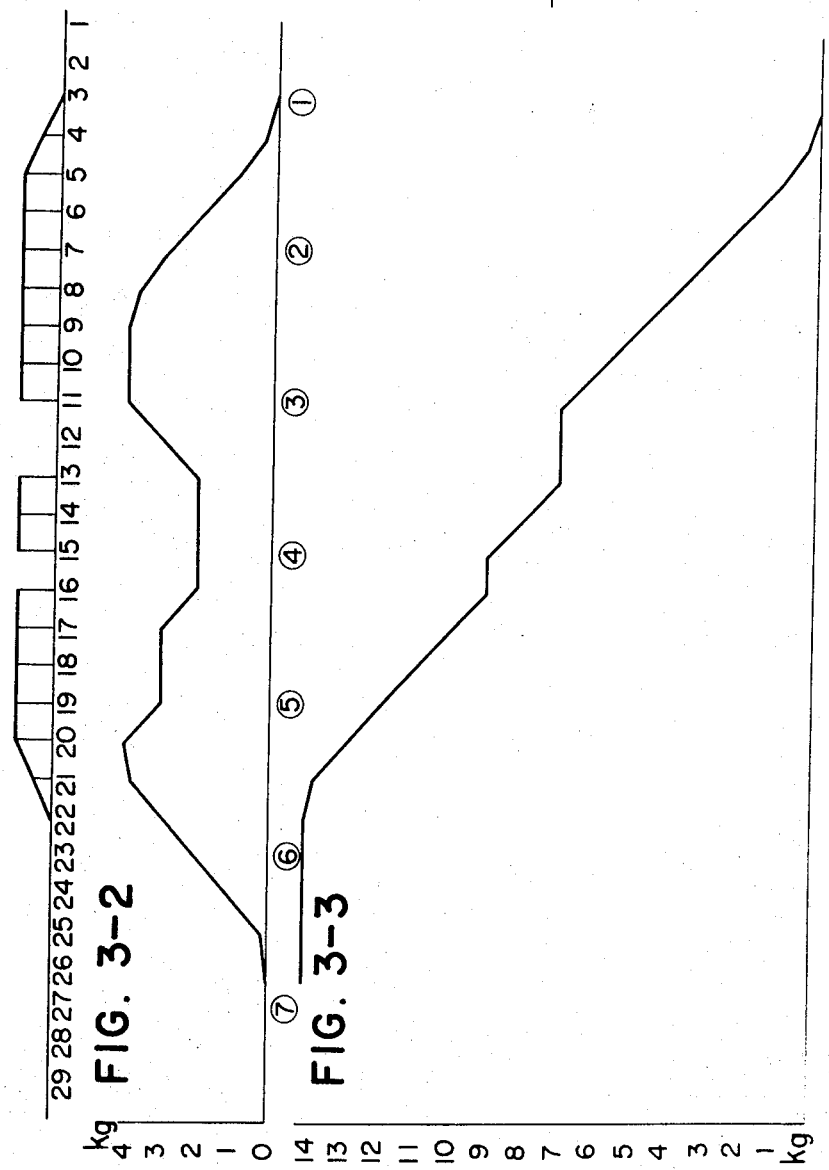

CONVEYOR TYPE CONTINUOUS WEIGHING SYSTEM

This invention relates to conveyor type continuous weighing systems and more particularly to a system of the kind above described in which a weight detector such as a load cell supports a weighing conveyor to detect the weight of a material continuously supplied onto the weighing conveyor and the information representative of the weight thus detected is stored and integrated successively so as to convey a predetermined weight.

Weighing errors have frequently occurred in conventional belt conveyor type continuous weighing systems due to a variation in the torque of the belt driving motor or due to a variation in the tension of the belt resulting from the expansion and contraction of the belt.

It is a primary object of the present invention to provide a novel and improved conveyor type continuous weighing system which obviates the defect of the conventional belt conveyor type weighing system.

Another object of the present invention is to provide a conveyor type continuous weighing system in which conveyor means such as a pan conveyor or chain conveyor can also be used as the weighing conveyor beside the belt conveyor.

The present invention provides the following advantages among others:

1. The precision of weighing can be improved to a value far higher than 1/200 whereas the precision of weighing with the conventional type is 1/200 at the most.
2. The weight of a material can be continuously measured until a predetermined value is reached whereas the conventional system can only measure the weight by the batch method.
3. The weight of lumps of large size unfit for conveying with a belt conveyor or the weight of a material which can only be conveyed by a chain conveyor or pan conveyor can be continuously measured.

FIG. 3–1 is a graph showing an example of transfer of a material onto the weighing conveyor.

FIG. 3–2 is a graph showing the variation in the weight of the material carried by the weighing conveyor when the material is transferred in the manner shown in FIG. 3–1.

Figure 2:
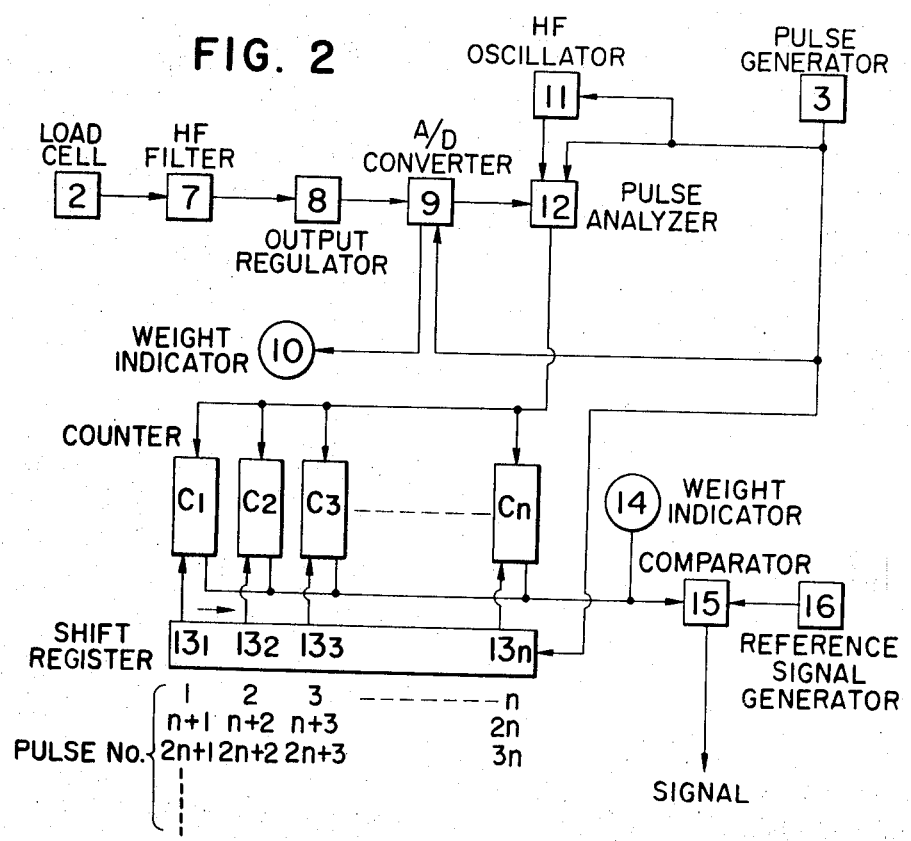
FIG. 2 is a block diagram of an electrical system employed in the embodiment shown in FIG. 1.

FIG. 3—3 is a graph showing the variation in the integrated weight when the material is conveyed in the manner shown in FIG. 3–2.

Figure 1:
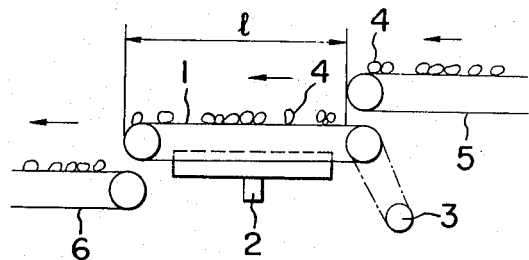
FIG. 1 is a diagrammatic side elevational view of a conveyor type continuous weighing system according to the present invention.

FIG. 4 is a graph showing how the weight is integrated when the material is conveyed in the manner shown in FIGS. 3–1 to 3–3.

Referring now to FIG. 1, a weighing conveyor 1 is supported bodily on a load cell 2. A pulse generator 3 is operatively connected to a driving or driven pulley or sprocket wheel for the weighing conveyor 1 so as to generate a train of pulses at equal intervals as the weighing conveyor 1 is advanced. It is supposed herein that the portion of the upper run of the weighing conveyor 1 which can receive and discharge a material 4 to be weighed has a length l and that n pulses are generated from the pulse generator 3 during the travel of the upper run portion of length l from one end to the other. A material supply conveyor 5 and a material receiving conveyor 6 are disposed adjacent to the opposite ends of the weighing conveyor 1, and the conveyor system is driven in a fixed direction as shown by the arrows. The weighing conveyor 1 may be any one of conveyor means including a belt conveyor, chain conveyor and pan conveyor, but it should be bodily supported on the load cell 2.

Referring to FIG. 2, an analog quantity detected by the load cell 2 is applied through a high-frequency filter 7 to an output regulator 8. The high-frequency filter 7 is provided for the purpose of removing an abrupt variation in the analog output from the load cell 2 due to the material 4 dropping from the conveyor 5 onto the weighing conveyor 1. The output regulator 8 is provided for the purpose of deriving solely the weight of the material 4 being weighed while cancelling the dead weight of the weighing conveyor 1 and regulating the input to an analog-to-digital converter 9 disposed in the next stage. The analog-to-digital converter 9 converts the analog signal into a digital signal and its output is locked during the period of time in which the pulse applied thereto from the pulse generator 3 persists. To this end, the pulse generated by the pulse generator 3 has a suitable width. In response to the application of the digital signal to a weight indicator 10 from the analog-to-digital converter 9, the weight indicator 10 indicates the weight of the material 4 on the weighing conveyor 1. A high-frequency oscillator 11 generates high-frequency pulses during the period of time in which the pulse applied from the pulse generator 3 persists, and the high-frequency pulses thus generated are applied to a pulse analyzer 12.

Due to the fact that $n$ pulses are generated from the pulse generator 3 during the travel of the upper run portion of length $l$ of the weighing conveyor 1 from end to end, $n$ counters $C_1, C_2, \ldots C_n$ are required. A shift occurs successively in a shift register 13 in response to the pulses applied from the pulse generator 3. Suppose now that the operating point of the shift register 13 is set at the position $13_1$ in response to the application of the first pulse or pulse No. 1 from the pulse generator 3. Then, a shift to the position $13_2$ occurs in response to the next pulse or pulse No. 2, a shift to the position $13_n$ occurs in response to the $n$th pulse or pulse No. $n$, a shift to the position $13_1$ occurs in response to the $(n + 1)$th pulse or pulse No. $n+1$, and so on. In this manner, the operating point of the shift register 13 shifts in a direction as shown by the arrow, and the counter C corresponding to the operating point has solely its input and output gates opened for making counting operation. The pulses applied from the high-frequency oscillator 11 pass continuously through the pulse analyzer 12 until the number thereof coincides with the numerical value applied to the pulse analyzer 12 from the analog-to-digital converter 9. Further, the high-frequency pulses pass continuously through the pulse analyzer 12 during the period of time in which the pulse applied from the pulse generator 3 persists. Under the above conditions, the high-frequency pulses applied from the high-frequency oscillator 11 pass through the pulse analyzer 12 to enter one of the counters $C_1, C_2, \ldots C_n$ whose input gate is opened by the shift register 13.

This counter C starts to count the number of pulses applied from the high-frequency oscillator 11 through the pulse analyzer 12. The output from the counter C whose output gate is opened is applied to an integrated weight indicator 14 and to a comparator 15.

With such an arrangement, the counter $C_1$ counts and stores the numerical value representing the weight of the material 4 carried by the weighing conveyor 1 at the time at which the first pulse is applied from the pulse generator 3. In this manner, the counters $C_1, C_2, \ldots C_n$ count and store successively the weight of the material 4 in response to the application of the pulses from the pulse generator 3. In response to the application of the $(n+1)$th pulse from the pulse generator 3, the counter $C_1$ counts and stores the numerical value again and this numerical value is added to the memory stored previously therein. Thus, the output from the counters $C_1, C_2, \ldots C_n$, namely, the numerical value indicated by the indicator 14 or the numerical value applied to the comparator 15 represents the sum of the weight of the material 4 having been discharged from the weighing conveyor 1 and the weight of the material 4 existing on the weighing conveyor 1. The comparator 15 compares the input applied thereto from the counters $C_1, C_2, \ldots C_n$ with a reference level applied from a reference signal generator 16 which sets a predetermined weight to be conveyed, and when the input attains the predetermined weight level, it generates a signal for stopping the supply of the material 4 onto the weighing conveyor 1 from the supply conveyor 5. Thus, the total weight of the material 4 conveyed by the weighing conveyor 1 is equal to the predetermined setting. The memory of the counters $C_1, C_2, \ldots C_n$ is erased after the predetermined weight has been measured so that the counters are ready for the next operation. While the above description has referred to the case in which the first pulse is applied to the shift register 13 when its operating point is set at the position $13_1$ for convenience of explanation, the starting point may be anyone of the positions $13_1, 13_2, \ldots 13_n$.

Table 1 shows the variation in the numerical values counted and stored in the counters $C_1, C_2, \ldots C_n$ assuming that no numerical values are stored in these counters before they start counting and that the material 4 starts to drop onto the weighing conveyor 1 when the first pulse is applied from the pulse generator 3.

TABLE 1

(n represents the number of pulses generated during the travel of the upper run of the weighing conveyor from end to end.)

| Counter C | Pulse no. | Reading on indicator 10 | Addend | Reading on indicator 14 |
|---|---|---|---|---|
| $C_1$ | 1 | $W_1$ | 0 | $W_1$ |
| $C_2$ | 2 | $W_2$ | 0 | $W_2$ |
| $C_3$ | 3 | $W_3$ | 0 | $W_3$ |
| . | | | | |
| $C_{n-3}$ | $n-3$ | $W_{n-3}$ | 0 | $W_{n-3}$ |
| $C_{n-2}$ | $n-2$ | $W_{n-2}$ | 0 | $W_{n-2}$ |
| $C_{n-1}$ | $n-1$ | $W_{n-1}$ | 0 | $W_{n-1}$ |
| $C_n$ | $n$ | $W_n$ | 0 | $W_n$ |
| $C_1$ | $n+1$ | $W_{n+1}$ | $W_1$ | $W_{n+1}+W_1$ |
| $C_2$ | $n+2$ | $W_{n+2}$ | $W_2$ | $W_{n+2}+W_2$ |
| $C_3$ | $n+3$ | $W_{n+3}$ | $W_3$ | $W_{n+3}+W_3$ |
| $C_{n-3}$ | $2n-3$ | $W_{2n-3}$ | $W_{n-3}$ | $W_{2n-3}+W_{n-3}$ |
| $C_{n-2}$ | $2n-2$ | $W_{2n-2}$ | $W_{n-2}$ | $W_{2n-2}+W_{n-2}$ |
| $C_{n-1}$ | $2n-1$ | $W_{2n-1}$ | $W_{n-1}$ | $W_{2n-1}+W_{n-1}$ |
| $C_n$ | $2n$ | $W_{2n}$ | $W_n$ | $W_{2n}+W_n$ |
| $C_1$ | $2n+1$ | $W_{2n+1}$ | $W_{n+1}+W_1$ | $W_{2n+1}+W_{n+1}+W_1$ |
| $C_2$ | $2n+2$ | $W_{2n+2}$ | $W_{n+2}+W_2$ | $W_{2n+2}+W_{n+2}+W_2$ |
| $C_3$ | $2n+3$ | $W_{2n+3}$ | $W_{n+3}+W_3$ | $W_{2n+3}+W_{n+3}+W_3$ |

An example of weighing operation will be described with reference to FIGS. 3–1, 3–2 and 3—3. It is assumed herein that four pulses are generated from the pulse generator 3 during the travel of the upper run portion of length $l$ of the weighing conveyor 1 from end to end. FIG. 3–2 in which the vertical axis represents the weight in kilograms shows the variation in the weight carried by the weighing conveyor 1 when the material 4 is transferred onto the weighing conveyor 1 in a manner as shown in FIG. 3–1. FIG. 3–2 shows the case in which a predetermined weight of 14 kilograms is conveyed between the pulse No. 3 to the pulse No. 22. FIG. 3—3 in which the vertical axis represents the weight in kilograms shows the variation in the integrated weight when the material 4 is conveyed in the manner shown in FIG. 3–2. Table 2 is a numerical representation of the weighing operation shown in FIGS. 3–1, 3–2 and 3—3, and FIG. 4 is a graphic illustration of Table 2.

While a preferred embodiment of the present invention has been described in detail with reference to the accompanying drawings by way of example, the present invention is in no way limited to such a specific embodiment and many changes and modifications may be made therein without departing from the spirit of the present invention.

Table 2

| Counter C | Pulse no. | Reading on indicator 10 (Kg) | Addend (Kg) | Reading on indicator 14 (Kg) |
|---|---|---|---|---|
| $C_1$ | 1 | 0 | 0 | 0 |
| $C_2$ | 2 | 0 | 0 | 0 |
| $C_3$ | 3 | 0 | 0 | 0 |
| $C_4$ | 4 | 0.25 | 0 | 0.25 |
| $C_1$ | 5 | 1 | 0 | 1 |
| $C_2$ | 6 | 2 | 0 | 2 |
| $C_3$ | 7 | 3 | 0 | 3 |
| $C_4$ | 8 | 3.75 | 0.25 | 4 |
| $C_1$ | 9 | 4 | 1 | 5 |
| $C_2$ | 10 | 4 | 2 | 6 |
| $C_3$ | 11 | 4 | 3 | 7 |
| $C_4$ | 12 | 3 | 4 | 7 |
| $C_1$ | 13 | 2 | 5 | 7 |
| $C_2$ | 14 | 2 | 6 | 8 |
| $C_3$ | 15 | 2 | 7 | 9 |
| $C_4$ | 16 | 2 | 7 | 9 |
| $C_1$ | 17 | 3 | 7 | 10 |
| $C_2$ | 18 | 3 | 8 | 11 |
| $C_3$ | 19 | 3 | 9 | 12 |
| $C_4$ | 20 | 4 | 9 | 13 |
| $C_1$ | 21 | 3.75 | 10 | 13.75 |
| $C_2$ | 22 | 3 | 11 | 14 |
| $C_3$ | 23 | 2 | 12 | 14 |
| $C_4$ | 24 | 1 | 13 | 14 |
| $C_1$ | 25 | 0.25 | 13.75 | 14 |
| $C_2$ | 26 | 0 | 14 | 14 |
| $C_3$ | 27 | 0 | 14 | 14 |
| $C_4$ | 28 | 0 | 14 | 14 |
| $C_1$ | 29 | 0 | 14 | 14 |
| $C_2$ | 30 | 0 | 14 | 14 |

What is claimed is:

1. A conveyor type continuous weighing system comprising a weighing conveyor supported bodily on a weight detecting means, means for continuously delivering an analog signal representative solely of the weight of a material being conveyed by said weighing conveyor, means for converting the analog signal into a digital signal, a pulse generator for generating a train of pulses at equal intervals as said weighing conveyor is advanced, n counters each having input and output gates where n is the number of pulses generated by said pulse generator during the travel of the upper run of said weighing conveyor from one end to the other, a shift register having an operating point which can be shifted successively from one position to the next to enable said gates sequentially, a high-frequency oscillator generating high-frequency pulses in response to the application of the pulse from said pulse generator as said weighing conveyor is advanced and ceasing to generate the pulses when the pulse applied from said pulse generator disappears, means for supplying the high-frequency pulses generated by said high-frequency oscillator to the counter whose input gate is opened due to the coincidence with the operating point in said shift register until the number of the high-frequency pulses agrees with the digital signal representative of the weight of the material on said weighing conveyor whereby each of said n counters can successively count and store the weight of the material on said weighing conveyor in response to the application of the successive pulses from said pulse generator while adding the new count to the previous count so as to deliver an output representative of the sum of the weight of the material having been discharged from said weighing conveyor and the weight of the material existing on said weighing conveyor, and means for comparing the output representative of the sum with a predetermined setting and delivering a signal for stopping the supply of the material onto said weighing conveyor when the weighed value agrees with the predetermined setting.

2. A system as claimed in claim 1, in which said weighing conveyor is a belt conveyor.

3. A system as claimed in claim 1, in which said weighing conveyor is a pan conveyor.

4. A system as claimed in claim 1, in which said weighing conveyor is a chain conveyor.

* * * * *

UNITED STATES PATENT OFFICE
CERTIFICATE OF CORRECTION

Patent No. 3,714,401      Dated January 30, 1973

Inventor(s) Yoshio Yano

It is certified that error appears in the above-identified patent and that said Letters Patent are hereby corrected as shown below:

Column 1, line 68, and Column 2, line 2 change "1" to --$\ell$--.

Signed and sealed this 10th day of July 1973.

(SEAL)
Attest:

EDWARD M. FLETCHER, JR.      Rene Tegtmeyer
Attesting Officer      Acting Commissioner of Patents